UNITED STATES PATENT OFFICE.

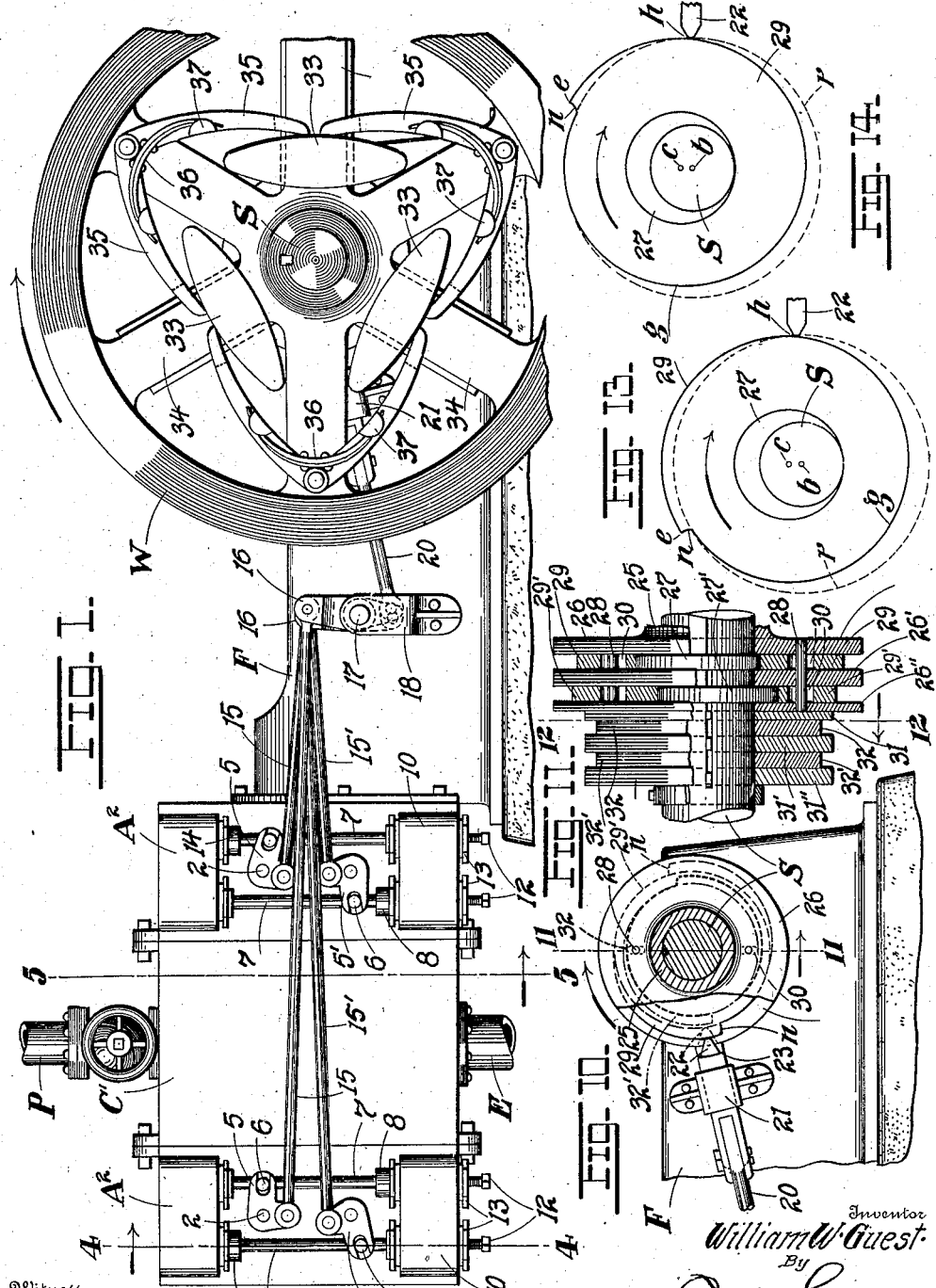

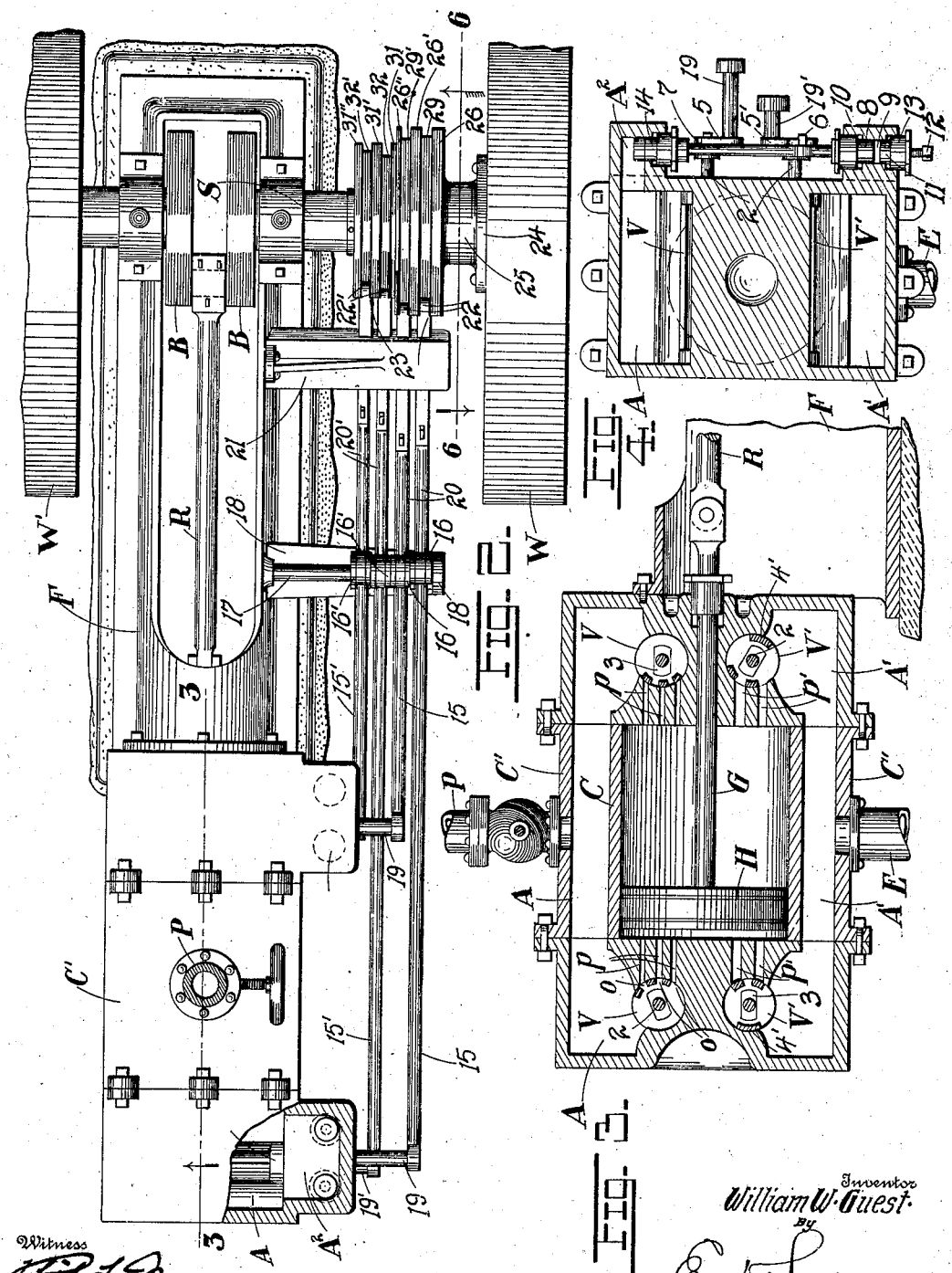

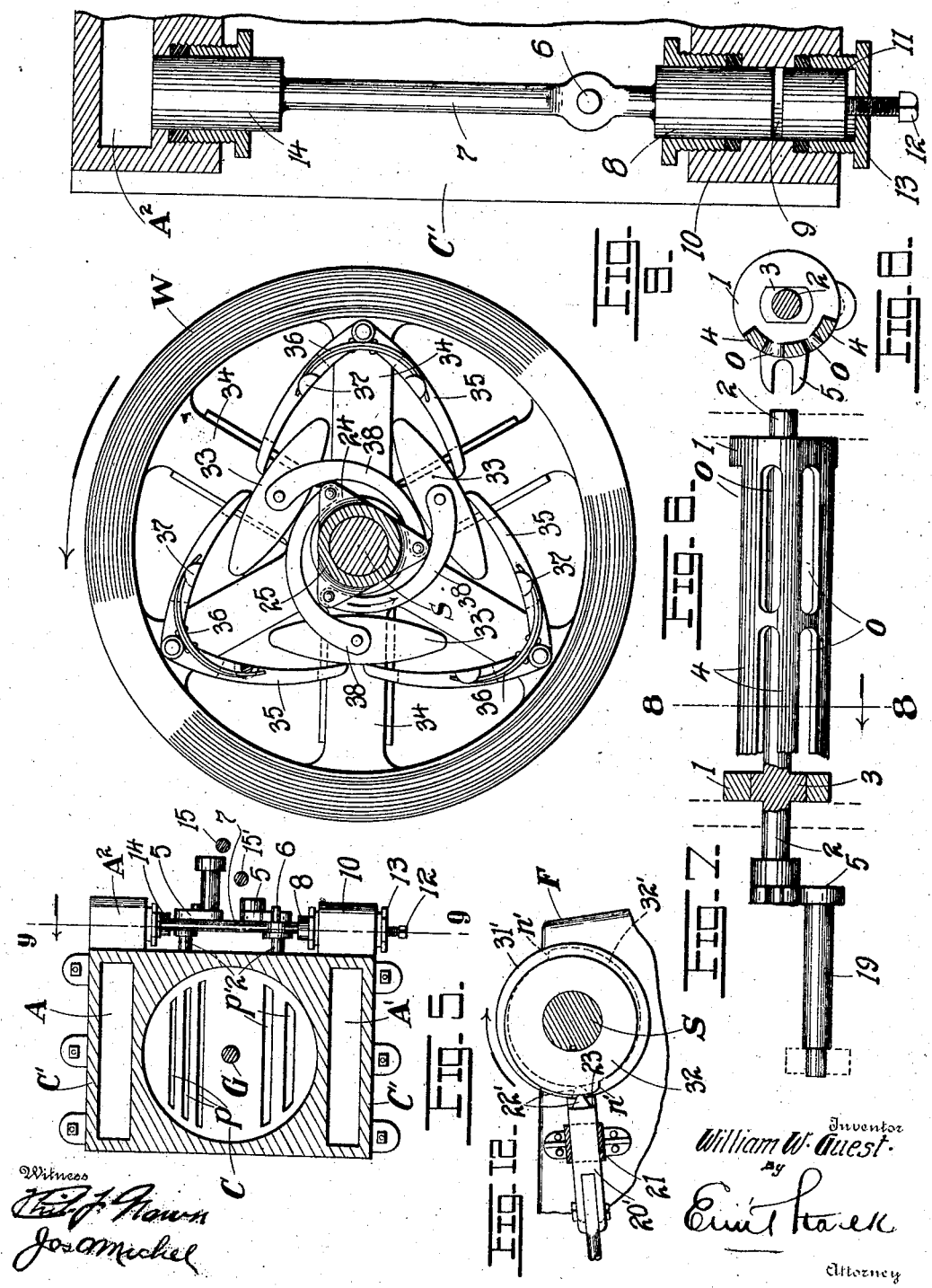

WILLIAM W. GUEST, OF ST. LOUIS, MISSOURI.

ENGINE VALVE-GEAR MECHANISM.

No. 827,234.　　　　Specification of Letters Patent.　　　　Patented July 31, 1906.

Application filed January 4, 1906. Serial No. 294,628.

*To all whom it may concern:*

Be it known that I, WILLIAM W. GUEST, a citizen of the United States, residing at St. Louis, State of Missouri, have invented certain new and useful Improvements in Engine Valve-Gear Mechanism, of which the following is a full, clear, and exact description, reference being had to the accompanying drawings, forming a part hereof.

My invention has relation to improvements in engine valve-gear mechanism; and it consists in the novel construction and arrangement of parts more fully set forth in the specification and pointed out in the claims.

In the drawings, Figure 1 is a side elevation of a double-acting steam-engine, showing my invention applied thereto. Fig. 2 is a top plan thereof. Fig. 3 is a vertical longitudinal section through the cylinder, taken on the line 3 3 of Fig. 2. Fig. 4 is a vertical transverse section taken through the steam-chest on the line 4 4 of Fig. 1. Fig. 5 is a vertical transverse section through the cylinder on the line 5 5 of Fig. 1. Fig. 6 is a vertical transverse section of the drive-shaft on the line 6 6 of Fig. 2 looking in the direction of the plain arrow therein and showing the shaft-governor in inside elevation. Fig. 7 is an elevational detail of one of the valves and of the terminal bell-crank secured to the outer end of the valve-spindle. Fig. 8 is a transverse section of the valve, taken on the line 8 8 of Fig. 7. Fig. 9 is an enlarged vertical section through the dash-pot, taken on the line 9 9 of Fig. 5. Fig. 10 is a section on the line 6 6 of Fig. 2 looking in the direction of the feathered arrow in said figure. Fig. 11 is a vertical section on the line 11 11 of Fig. 10, the shaft being in elevation, showing the character of the cam formations by which the valves (both live steam and exhaust) are operated. Fig. 12 is a vertical section on line 12 12 of Fig. 11, showing the specific cam formations by which the exhaust-valves are operated; and Figs. 13 and 14 are diagrammatic views showing the positions of the valve-actuating cam under two different velocities of the drive-shaft.

The object of the present invention is to provide a valve-gear mechanism in which the movement of the valve in one direction—that is to say, the closing movement—will be effected by the direct pressure of steam in the steam-chest, and while the chief importance of the invention resides in the sudden and effective closing of the inlet or steam valve, the mechanism is so designed that it will effect the closing of the exhaust-valve as well.

The invention is conveniently adapted and serviceable for high-speed engines where the high velocity of the moving parts requires an instantaneous closing of the valve at the point of cut-off.

A further object of the invention is to preserve the initial pressure on the piston up to the moment of the cut-off, thereby effecting perfect expansion and eliminating wiredrawing, so objectionable with the majority of engines. Under such circumstances the work of expansion will be represented by a truly adiabatic curve sharply defined from the steam-line, as will be hereinafter more fully apparent.

A further object is to accomplish the seating of the valve with a minimum amount of impact, one which is unseated or opened with a minimum expenditure of power, one in which undue strain is removed from the parts in coöperative connection with the valve, one applicable to any motor-fluid engine, be it steam, air, gas, or other fluid, one which is sensitive and directly and instantly responsive to the variable velocities of the drive-shaft, and one possessing further and other advantages better apparent from a detailed description of the invention, which is as follows:

Referring to the drawings, F represents a suitable engine-frame, S the drive-shaft, mounted therein, and W W' fly-wheels mounted at opposite ends of the shaft.

C represents the cylinder proper, the same being confined within a sectional outer casing C', between whose top and bottom and end walls, respectively, and the corresponding walls of the cylinder are formed chambers A A', serving, respectively, as live and exhaust steam chests. The inlet-pipe is represented by P, and the exhaust by E. The frame F is suitably hollowed out to accommodate the double crank-arm B, from which leads the connecting-rod R, the opposite end of the connecting-rod being coupled to the piston-rod G, in turn connected to the piston H. The parts described are well known and understood and require no special description, their operation being clear.

Disposed at each end of the chests A A' and on opposite sides of the division-walls separating the chests, Fig. 3, are (preferably) rotary cylindrical steam and exhaust valves V V', respectively, of substantially similar construction except that the live-steam valve has series of three ports discharging into as many passages $p\ p\ p$, leading into the cylinder, whereas the exhaust-valve has series of two larger ports communicating with the corresponding passages $p'\ p'$, leading from the cylinder. The valve-ports result from the specific construction of the valve-body to be now described, special reference being had to Figs. 7 and 8, which represent the steam-valve. The valve is composed of terminal circular heads 1 1, through which passes centrally the valve-spindle 2, the latter being provided with oblong blocks or keys 3, which enter corresponding openings formed in the heads, and since the keys are incapable of rotation within the heads it follows that when rotation or a rocking motion is imparted to the spindle 2 a corresponding rotation or rocking motion is imparted to the heads. The heads are connected with an intermediate portion 4, forming a section of the peripheral wall of a cylinder, of which the heads 1 1 constitute the ends. This peripheral cylinder portion 4 is provided with ports $o$ in series of two, the longitudinal edge of said portion 4 forming a third port $o$ with the outer bounding-wall of the adjacent passage $p$, as fully shown on Fig. 3. The outer end of the spindle 2 is extended a suitable distance beyond the side vertical wall of the casing C' and carries a bell-crank lever 5, the forked end of one arm of which engages a laterally-projecting stud or pin 6 on the stem 7 of the dash-pot plunger 8, operating in the cylindrical cavity 9 of a basal extension 10 of the casing C'. The cushioning of the plunger is accomplished by the compression of the air confined between the plunger and a disk or block 11, which can be adjusted to secure any degree of compression by the screw 12, mounted on the gland or stuffing-box 13. The upper end of the stem 7 terminates in a piston 14, whose inner face is at all times exposed to the full pressure of the live steam in the overhanging extension $A^2$ of the steam-chest A, the tendency of the steam being to force the piston 14 and the plunger 8 downward. In such downward movement the stud 6, which is in engagement with the forked arm of the bell-crank 5, rocks the bell-crank about its axis, (being the axis of the valve-stem 2,) said crank in turn rocking the valve-stem 2 and its valve V V' to what corresponds to the closed position for the valve.

Reference to Figs. 1 and 3 shows that the left-hand steam-valve V and the right-hand exhaust-valve V' are open, (the piston being ready to travel to the right) and the left-hand exhaust-valve V' and the right-hand steam-valve being closed. Since the several bell-cranks and dash-pots are identical, the description for one suffices for all, and the same reference-numbers are accordingly used for all of them, except that the exhaust-steam bell-cranks are identified by 5'. As to the valves, the only difference between them is that the exhaust-valve controls two passages $p'\ p'$ instead of three and the further difference that the terminal disks or ends 1 1 of the exhaust-valve have an additional peripheral connecting-section 4', Fig. 3, to afford an additional bearing against the pressure of steam to which the valve is subjected by the live steam in driving the piston H.

From the foregoing it will be seen that the closing of the valve V V' is accomplished by the direct action of the live steam through the movement of the dash-pot piston, which is at all times exposed to the direct and full pressure of the steam in the steam-chest. The opening of the valves, on the other hand, is accomplished by a system of cams mounted on the drive-shaft, which cams actuate a series of plungers in turn connected by means of links to the second arm of each of the bell-cranks 5. These valve-opening devices may be described as follows: Leading forward toward the drive-shaft from each second arm of the bell-crank is a link or connecting rod 15, identified with the live-steam valves V and 15', identified with the exhaust-valves V'. The forward ends of the links 15 are coupled to the upper ends of the oscillating levers 16, and the corresponding ends of the links 15' are coupled to the upper ends of corresponding levers 16', mounted on a spindle or shaft 17, projecting from the main frame F and in turn supported at its outer end by a bracket 18. In order that the several links 15 15' may all be disposed in parallel vertical planes side by side, the ends of the arms of the bell-cranks to which the connection is made are necessarily provided with elongated pins or studs 19 19', as fully shown in Fig. 1, to which pins the links 15 15' are pivotally coupled. The ends of the lower arms of the oscillating levers 16 16' are in turn coupled to a series of reciprocating plungers 20 20', said plungers loosely operating through openings formed in a supporting arm or bracket 21, projecting laterally from the engine-frame, the free ends of the plungers terminating in reduced pawls 22 22', respectively, a shoulder 23 being formed on each side of each pawl with the body of the plunger, as clearly shown in Figs. 1 and 10. The pawls 22 22' of the respective plungers 20 20' ride over suitable cam formations on the shaft, said cams forcing the plungers in one direction, whereby the levers 16 16' are oscillated in proper direction to exert a pull on the links 15 15', and thus rock the bell-cranks 5 5' in proper direction to open the valves V V', the steam, through the medium of the dash-pot plungers, on the other hand, seating or rocking the valves to a closed position the instant that the pawls have passed out of the influence of the eccentric formations of the cams, as will appear from the construction of the cams, which I will now describe.

Mounted loosely on the shaft S adjacent to the fly-wheel W and rotatable freely about said shaft is a triangular member or plate 24, having a hub portion 25, with which hub portion is integrally formed a circular disk or "rider" 26, the center of rotation of these parts being on the axis of the shaft S. Secured to the shaft next to the disk 26 is an eccentric 27, whose center is disposed on one side of the axis of the shaft. Disposed loosely on the shaft next the eccentric is a second disk or rider 26', Fig. 11. Secured to the shaft next the disk 26' is a second eccentric 27', whose center is on the opposite side of the axis of the shaft—that is, one hundred and eighty degrees from the center of the eccentric 27. Loosely mounted on the shaft next the eccentric 27' is a third disk or rider 26''. The disk 26 is provided with laterally-projecting pins 28, which pass through the disks 26' 26'', the pins coupling the several disks together and permitting them to revolve as a unit with the plate 24 when rotation is imparted to the latter, be such rotation in unison with the shaft or independent thereof. Mounted loosely over the peripheries of the eccentrics 27 27' and rotatable freely about the centers of the respective eccentrics are cams 29 29', respectively, the cams being provided with elongated openings 30 for the free passage of the pins 28 therethrough, the openings 30 being elongated sufficiently in a radial direction to allow for the variations in the distances of the pins 28 from the centers of the eccentrics about which the cams rotate. For the present it will be sufficient to state that as the plate 24 rotates about the shaft the several riders 26 26' 26'' will rotate in unison with it, the pins 28 in turn rotating the cams about the eccentrics, and it may be stated in passing that the cams 29 29' actuate the pawls 22 of the plungers 20 20, the latter in turn controlling the links 15 15, which lead from the live-steam valves V, the valves being rocked to their open position by the cams, as presently to appear. Keyed to the shaft S adjacent to the rider 26'' and spaced suitable distances apart are disks or riders 31 31' 31'', and between them are frictionally or otherwise held the cams 32 32', the eccentric formations of which are substantially one hundred and eighty degrees apart to conform with a similar disposition between the cams 29 29'. The cams 32 32' actuate the pawls 22' of the plungers 20', the latter in turn controlling the links 15', which lead from the exhaust valves V'. The plungers 20 20' rest with their shoulders 23 between their corresponding pairs of riders 26 26' 26'' and 31 31' 31'', the pawls 22 22' thereof projecting between the riders to engage with the eccentric formations of the cams as presently to be seen.

The shaft makes a complete revolution for a double stroke of the piston or a half-revolution for each single stroke, so that at the beginning of each stroke (that is, single stroke) one steam-valve V must be open to admit steam behind the piston, and one exhaust-valve V' must be open to release the exhaust-steam from in front of the piston. This condition is already shown in Figs. 1 and 3, where the piston is beginning a stroke toward the right, and it is for this reason that the cams 29 29' 32 32' are set one hundred and eighty degrees apart, since it is at each half-revolution of the shaft that the respective valves controlling the live and exhaust steam must be shifted. The cams are all of substantially the same contour, the eccentric formation of each terminating in a nose $n$, ($n'$ for the exhaust-valves,) the noses of the respective pairs of cams being one hundred and eighty degrees apart, the noses of cams 29 32' and 29' 32 being identified with the specific pairs of cams which control corresponding pairs of valves V V'.

In Figs. 1, 2, 3 the eccentric formations of the cams 29 32' have, in fact, forced their respective pair of plungers 20 20' rearwardly, these in turn having oscillated their particular levers 16 16' in proper direction to exert their pull on the links 15 15' and rock the valves V V', as shown in Fig. 3, to their open position. The formation of the live-steam cam is such as to keep the valve V open for substantially two-thirds of the piston-stroke or while the cam is passing an arc of one hundred and twenty degrees revolution. When that is reached, the pawl of the plunger passes off the nose $n$, forming the terminal of the cam formation, the release of the plunger from the cam formation permitting the steam-pressure to suddenly depress the dash-pot plunger, whose stem 7 is coupled to the bell-crank 5, and thus instantly rock the valve to a closed position. For the remainder of the piston-stroke the steam acts by expansion. The formation of the exhaust-steam cam of course is such as to keep the valve V' open during a full stroke of the piston in order to enable the steam to exhaust till the end of the stroke is reached. When that happens, the next set of cams 29' 32 are brought into requisition, whereupon the right-hand valve V and left-hand exhaust-valve V' are opened to start the piston in the opposite direction, it being understood that at the end of the stroke just completed the right-hand exhaust-valve V' was closed in the manner described for the valve V—that is to say, by means of steam actuating the dash-pot plunger identified with said valve. The valve V, which, as stated, comes to a closed position at the end of a two-thirds stroke of the piston, remains closed not only for the last third of the piston's stroke, but for the full return stroke of the piston—that is to say, for a revolution of the shaft through two hundred and forty degrees—while the exhaust-valve remains closed for only one hundred and eighty degrees of the shaft's revolution. This is obvious, of course, since the live steam works by expansion for the last third of the piston's stroke, which means sixty-degrees revolution, and it must remain closed for the full return of the piston's stroke, which corresponds to one hundred and eighty degrees revolution or a total of two hundred and forty degrees. The exhaust-valve, on the other hand, opens and closes at the end of each stroke of the piston—that is, with each one hundred and eighty degrees revolution.

The explanation as given above for the action of the cams is on the assumption that the several cams revolve in unison with the shaft S. So far as the exhaust-valve cams 32 32' are concerned that is a fact; but so far as the live-steam cams 29 29' are concerned that is not always true, since their speed of rotation is controlled by the shaft-governor to which the plate 24 is directly coupled, it being remembered that the said plate is capable of rotation independent of the shaft, being mounted loosely thereon. If the shaft revolves too rapidly, the governor mechanism will impart to the plate 24 a slight rotation about and in advance of the angular velocity of the shaft, the angle through which the plate is thus moved determining the angle through which the riders 26 26' 26'' shall be rotated about the shaft, and hence determining the angle through which the cams 29 29' (through the medium of the pins 28) shall be rotated about the eccentrics 27 27'. This independent movement thus imparted to the cams about their eccentrics directly controls the extent of the cam formation which is available for actuating or pushing the plungers outwardly to rock the steam-valves to their open position.

Before attempting a description of the shaft-governor by which independent angular movements are imparted to the plate 24 about the shaft S according to the speed of rotation of said shaft, I will for the time being assume such movement for purposes of explaining the effect on the available length or extent of the eccentric portion of the cam (29 29') by which the plunger 20 is actuated. This explanation will be best understood by a reference to the diagrammatic views shown in Figs. 13, 14, which illustrate two positions of the cam with respect to the eccentric mounted on the shaft. In these views the point $b$ represents the center of the shaft S, the point $c$ the center of the eccentric 27, and $r$ represents a circle concentric with the shaft and with the riders on the shaft. The cam 29 comprises an outer eccentric section described from the center $c$ with a radius equal to $b-r$, and extending for substantially one hundred and twenty degrees from the point $e$ to the point $h$, at which latter point the arc $e-h$ merges with or is tangent to the circle $r$. At the point $e$ is formed the nose $n$ of the cam, the depth of the nose extending from the point $e$ to the circle $r$. From the base of the nose is struck an arc of one hundred and twenty degrees extending to the point $g$ with a radius equal $b-r$ minus $b-c$, and from $c$ as a center. The balance of the cam from $g$ to $h$ may be of any curvature so long as it comes within the circle $r$.

Referring again to Fig. 13, if we consider for the moment that the parts S, 27, and 29 revolve as a unit about the center $b$ then the section $e-h$, being the only portion of the cam outside the circle $r$, will be available for pushing against the pawl 22, and thus push outwardly the plunger which said pawl terminates. As this unit revolves the valve will be open for a period of time corresponding to the cam-section $e-h$, or one hundred and twenty degrees revolution of the shaft, when the pawl 22 drops down the nose $n$ and for two hundred and forty degrees travels along the cam, first to $g$ and thence to $h$, but always inside the circle $r$, so that for two hundred and forty degrees the valve will remain closed, (being rocked to said position by the action of the live steam on the piston of the dash-pot plunger, which is coupled to the valve through the bell-crank connection described,) being that there is no eccentric portion outside the circle $r$ to displace the innermost position of the pawl 22. The one-hundred-and-twenty-degrees shaft-revolution represents the maximum length of time during which the valve V may remain open. Suppose now that the engine is running too fast. The following then results: It must be remembered that the cam 29 is rotatable freely about the eccentric 27, the cam rotating about the center $c$ of the eccentric. Referring now to Fig. 14, it will be seen that the cam has gained on the eccentric and shaft, this gain resulting from the independent angular advance given the cam by the shaft-governor as a result of a too great speed. Now since the arc $e-h$ described from $c$ as a center will always be tangent to the circle $r$ at the point $h$ it follows that with any independent angular advance of the cam over the eccentric the available length of the arc $e-h$ (or that portion which is outside the circle $r$) will be reduced or shortened, so that now the pawl 22 will be affected for such reduced length of the arc $e-h$, (being about sixty degrees in Fig. 14,) the valve remaining open for a much less time and closed for a greater length of time, (three hundred degrees.) The angular advance under a very high speed may be so increased as to cut the available length of the arc $e-h$ to only a few degrees, in which event the steam would be excluded from the cylinder until the engine had been materially reduced in speed; but whatever may be the degree of angular advance of the cam over the eccentric no portion of the cam's curvature beyond the tangent point $h$ (which is fixed) can ever pass outside of the circle $r$, and hence can never force the valve to an open position until the proper time. The circle $r$ virtually represents the limit of the inner movement of the pawl and is used herein for convenience to better fix the point $h$ with reference to which the length of the available cam portion is calculated. The cams for the exhaust-valves of course remain in permanent relation to the shaft, being that the steam exhausts for each complete stroke. For this reason the available cam-surface operating the pawls 22' is virtually one hundred and eighty degrees.

Having described the manner by which the pawls 22 22' are displaced by the cams to push their respective plungers in the proper direction to impart the necessary rocking motion to the valves for opening the same, I will now describe the shaft-governor, by which independent angular movement is imparted to the plate 24, to which the cams are coupled. In the present case the governor consists of a series of sliding weights 33, mounted on radial arms 34 of the fly-wheel W, the weights being forced inwardly by the hinged arms 35, carried on each face of the fly-wheel by the parts 34, the arms being controlled by the contracting springs 36, mounted behind the lobes 37, cast with the arms. The inner faces of the weights are pivotally coupled to the corners of the plate 24 by curved links 38. By reference to Fig. 6 it is obvious that should the speed of the shaft (revolving as indicated by the arrow) S materially increase the centrifugal force will drive the weights 33 radially outward, in which movement they will draw on the links 38, thereby giving the plate 24 an independent rotation or angular movement independent of and in advance of the shaft. This angular advance of the plate 24 of course imparts rotation to the riders 26 26' 26'', and these in turn, through the medium of the pins 28, will impart the necessary angular advance to the cams 29 29', thereby reducing the time during which the valves V V will remain in their open position. The device is therefore self-regulating.

Obviously the eccentrics 27 27' are set one hundred and eighty degrees apart, since the cams 29 29' are brought into requisition with each alternate stroke. When a plunger is pushed in proper direction to rock a valve to an open position, the dash-pot plunger offers no resistance to the upward rocking motion of the bell-crank which actuates it except the resistance of its own weight, the steam-pressure bearing on the piston 14 thereof being for all essential purposes balanced by the air compressed between the plunger 8 and block 11. There is therefore no material strain on the plungers and intermediate connections. On the other hand, the moment a pawl 22 22' passes the point $e$ of the cam 29 29', Figs. 13, 14, or the corresponding point on the cam 32 32', that instant the steam in the steam-chest forces the dash-pot plunger downward and instantly closes the valve, the valve being rocked to such closed position by the downward movement of the stem 7 actuating the bell-crank coupled to the valve-spindle; but though the closing of the valve is instantaneous, yet the same takes place without a jar, owing to the cushioning of the plunger 8 by the air compressed beneath it.

By reason of the instantaneous closing of the valve at the point of cut-off $e$ an engine with my improvement may be run with a maximum degree of speed. The valves here shown, though rock-valves, may be slide-valves without departing from the spirit of my invention.

Having described my invention, what I claim is—

1. In an engine, a steam-valve, means coupled thereto for actuating the valve in one direction, an eccentric on the engine-shaft, a cam rotatable about said eccentric, and intermediate connections between the cam and valve for actuating the valve in the opposite direction, substantially as set forth.

2. In an engine having a cylinder and piston, a steam-valve therefor, a drive-shaft, cam formations disposed on and rotatable about the shaft for actuating the valve in one direction, and means controlled by the pressure of live steam for actuating the valve in the opposite direction, substantially as set forth.

3. In an engine having a cylinder and piston, a drive-shaft, eccentrics on the shaft, cams rotatable freely about the eccentrics, means for imparting an angular advance to the cams independent of the angular velocity of the eccentrics and thereby varying the available effective cam formation about the eccentric, steam-valves for the cylinder, intermediate connections between the cams and valves for actuating the latter in one direction, and means controlled by the pressure of the live steam for actuating the valves in the opposite direction, substantially as set forth.

4. In an engine, a drive-shaft, an eccentric on the shaft, a cam rotatable about the eccentric and having a center of rotation concentric with the eccentric, and having a formation concentric with such center, one end of such formation being tangent to a circle concentric with the center of the shaft, the opposite end of said formation terminating in a nose or depression, the remaining portions of the cam being disposed within the circle defining the base of said nose and concentric with the shaft, a valve for the engine, and intermediate connections between the valve and cam for actuating the valve in one direction upon engagement of said connections with the cam formation aforesaid, substantially as set forth.

5. In an engine, a drive-shaft, an eccentric on the shaft, a cam rotatable about the eccentric and having a center of rotation concentric with the eccentric, a formation on the cam concentric with such center but eccentric to the center of the shaft, one end of such formation being tangent to a circle concentric with the shaft center, the opposite end of said formation terminating in a nose or depression, the remaining portions of the cam being disposed within a circle interior to the base of the nose and concentric with the shaft center, a valve for the engine, intermediate connections between the valve and cam for actuating the valve in one direction upon engagement of said connections with the cam formation aforesaid, and means controlled by the pressure of the steam for actuating the valve in the opposite direction, substantially as set forth.

6. In an engine, a drive-shaft, a governor on the shaft, a system of cams rotatable about the shaft and coupled to the governor and adapted to have imparted thereto an angular movement independent of the rotation of the shaft, valves for the engine, intermediate connections interposed between the cams and valves for actuating the latter in one direction upon rotation of the shaft and cams, the intervals of actuation depending on the degree of angular movement imparted to the cams, and devices controlled by the steam-pressure for actuating the valves in the opposite direction upon their release from the influence of the cams, substantially as set forth.

7. In an engine, a drive-shaft, a shaft-governor, a member freely rotatable about the shaft and controlled by said governor, a pair of eccentrics spaced suitable distances apart formed on the shaft in proximity to said rotatable member, annular disks or riders freely rotatable about the shaft and disposed on opposite sides of the eccentrics, pins for coupling the riders together, the terminal rider of the series being secured to the rotatable member, cams rotatably mounted about the eccentrics and having slots for the passage of the pins aforesaid, a series of reciprocating plungers bearing on the riders and terminating in pawls adapted to be actuated by the cams, a series of steam and exhaust rock-valves for the engine, bell-cranks coupled to the valve-spindles and having each an arm coupled to a plunger, and steam-actuated dash-pot plungers having each a stem coupled to the second arm of the bell-crank, the parts operating substantially as, and for the purpose set forth.

8. In an engine, a steam-valve, a steam-actuated dash-pot plunger coupled thereto for actuating the valve in one direction, a cam rotatable about the engine-shaft, and intermediate connections between the cam and valve for actuating the valve in the opposite direction, substantially as set forth.

9. In an engine, a steam-valve, a steam-actuated dash-pot plunger coupled thereto for actuating the valve in one direction, an eccentric on the engine-shaft, a cam rotatable about said eccentric, and intermediate connections between the cam and valve for actuating the valve in the opposite direction, substantially as set forth.

In testimony whereof I affix my signature in presence of two witnesses.

WILLIAM W. GUEST.

Witnesses:
EMIL STAREK,
JOS. A. MICHEL.